Jan. 18, 1966 F. A. H. RICE 3,230,212
CROSS-LINKED CELLULOSIC POLYMER
Filed April 27, 1960
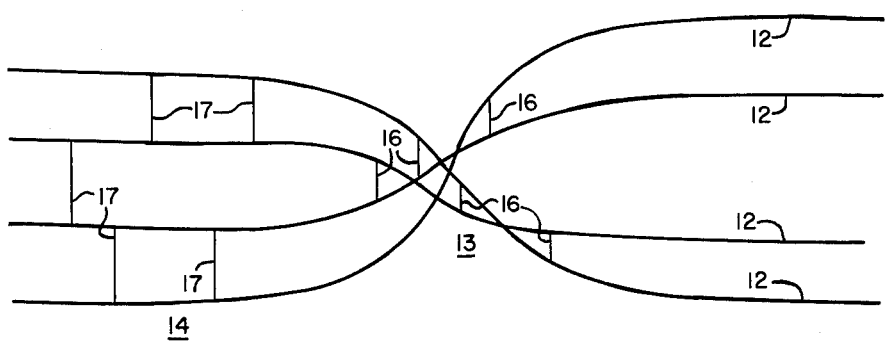
INVENTOR.
FREDERICK A. H. RICE
BY J. W. Brennan
W. E. Quesenberry
O. Hodges
ATTYS.

3,230,212
CROSS-LINKED CELLULOSIC POLYMER
Frederick A. H. Rice, Oxon Hill, Md., assignor to the United States of America as represented by the Secretary of the Navy
Filed Apr. 27, 1960, Ser. No. 25,177
5 Claims. (Cl. 260—223)
(Granted under Title 35, U.S. Code (1952), sec. 266)

The invention described herein may be manufactured and used by or for the Government of the United States of America for governmental purposes without the payment of any royalties thereon or therefor.

This invention relates to the field of cellulose chemistry and is more particularly concerned with a method for cross-linking cellulose and its derivatives and the product obtained thereby.

It is known that the physical and chemical properties of various polymers may be altered by cross-linking the polymer chains. Generally, this is accomplished by using various compounds which react with adjacent chains of the polymer. For example, the setting of many resins is promoted or initiated by the cross-linking induced by so called accelerators. Cellulose and its derivatives, cellulose nitrate and cellulose acetate have been employed for many years in widely diversified fields, in the textile industry, the explosive industry and the film and "plastic" industry. Up to the present time, however, attempts to modify the properties of cellulose and its derivatives by cross-linking the polymer chains have not been completely successful.

It is an object of this invention to improve the physical and chemical properties of cellulosic materials for specific applications by cross-linking these materials.

Another object is to provide a cellulosic material having physical properties controlled by a predetermined degree of cross-linking.

Still another object is to provide a new and improved method for cross-linking cellulose and its derivatives.

These and other objects will become apparent when the following specification is read and considered along with the accompanying drawing which depicts the fibers of a typical cellulose material.

Basically, the cellulosic materials are cross-linked by preparing a cellulose derivative containing reactive groups which serve as the sites for cross-linking. For example, types of nitrocellulose containing carboxylic acid groups and types of nitrocellulose containing carboxylic acid and hydroxyl groups may be employed to incorporate a large number of compounds in the cellulosic polymer with consequent alteration of both its physical and chemical properties. The modified cellulose may be cross-linked by esterification of the hydroxyl groups in one cellulose chain with the carboxylic groups on an adjacent chain, by esterification of multihydroxyl compounds with carboxylic acid groups on two nitrocellulose chains, or by the formation of amides by reaction of the carboxylic acid groups on adjacent chains with a compound containing two amino groups.

The cellulose suitable for practicing this invention may be chemically treated to promote potentially reactive centers. Cellulose may be reacted with appropriate chemicals to modify it so that it contains carboxylic acid groups or carboxylic acid and hydroxyl groups.

A type of cellulose or cellulose derivative that contains carboxylic acid groups is prepared in the following manner:

*Example 1.*—Oxidized cellulose acetate obtained commercially was deacetylated by treatment with a calculated 1% excess of a 10% aqueous solution of sodium hydroxide. The deacetylated product separated from solution, was washed with acetone and dried at room temperature under reduced pressure. Fifteen grams of the product was reduced by suspending it in a solution of sodium borohydride (1–2 gm./500 ml. of water) and stirred at 0 C. for four hours. The product was removed by filtration and washed with several liters of water containing 0.5% HCl to remove the sodium ions from solution. The product was then washed with several liters of distilled water followed by acetone and dried under reduced pressure at room temperature. This yielded a cellulose containing carboxylic acid groups but no aldehyde or ketone groups. The cellulose may be nitrated in the usual manner with a mixture of nitric acid and phosphorous pentoxide.

The nitrocellulose thus produced contained approximately 1% carboxylic acid groups. If it is desired to produce a cellulose containing 12%–19% carboxylic acid groups, oxidized cellulose, obtained commercially may be employed as the starting material. Since oxidized cellulose containing 12%–19% carboxylic acid groups is somewhat soluble in dilute alkali, the procedure may be modified.

To maintain the original physical form of the oxidized cellulose, and to produce a well oriented cross-linked polymer, it may be necessary to employ solvents in which none of the cellulose products are soluble.

*Example 2.*—Oxidized cellulose in the form of a gauze was treated with a mixture of sodium bicarbonate and sodium borohydride in a mixture of 10 volumes methanol and one volume of water. The gauze was removed from the reducing medium, washed several times with methanol and then 95% ethanol containing 1% HCl to remove the sodium. The gauze was then dried and nitrated.

*Example 3.*—When it is not necessary to retain the original physical form of the cellulose, the oxidized cellulose was reduced by treatment with sodium bicarbonate in a borohydride solution. The reduced product was recovered by pouring the solution into ethanol. The cellulose was washed and dried in the same manner employed for oxidized cellulose that contained 1% carboxylic groups.

For some applications it may be desirable to employ an acetate rather than cellulose or its nitrate. The acetate may be prepared in this manner.

*Example 4.*—Oxidized cellulose acetate (10 g.) was dissolved in 500 ml. of dioxane. Five ml. of water and 2 gm. of sodium borohydride were added, the mixture stirred for four hours, filtered, and the reduced product precipitated by pouring the solution into five volumes of petroleum ether (B.P. 30–60° C.). The reduced oxidized cellulose acetate contained both carboxylic acid and hydroxyl groups. The hydroxyl groups formed by the reduction were acetylated with acetic anhydride using sulfuric acid as a catalyst.

*Example 5.*—Five grams of oxidized cellulose in the form of a gauze was reduced with excess sodium borohydride (1 g.) in methyl alcohol (250 ml.) at 0°. Excess glacial acetic acid was added (50 ml.) to destroy the unreacted sodium borohydride. The solution was decanted, the gauze covered with 500 ml. of ethanol and concentrated aqueous HCl added to adjust the pH to 2–3. The reduced product was removed and washed several times with ethanol-water (1:1 by volume) solution, then with absolute ethanol and finally with diethyl ether. The product, still in the form of a gauze, was dried in vacuum and nitrated in the usual manner with a mixture of nitric and phosphoric acids.

A second type of cellulose or cellulose derivative containing both carboxylic acid and hydroxyl groups is produced in the following manner.

*Example 6.*—Oxidized cellulose was nitrated in the usual manner, then reduced with sodium borohydride which selectively reduces only the glycosyl nitrate group. The nitrocellulose thus produced contained both carboxylic acid groups and alcohol groups that originated from the reduction of the reducing groups.

*Example 7.*—Oxidized cellulose acetate was reduced in the same manner as in Example 4. The reacetylation step was omitted to produce an acetylated derivative containing both carboxylic acid and hydroxyl groups.

*Example 8.*—Oxidized cellulose acetate was deacetylated and methylated by treatment with sodium hydroxide and dimethyl sulfate according to known practice. After methylation, 20 gm. of the product were dissolved in 500 ml. of anhydrous dioxane; 5 ml. of water and 2 gm. of sodium borohydride were added to the solution which was then stirred for four hours. The solution was filtered and the methylated cellulose derivative was recovered by pouring the solution into petroleum ether.

For convenience, the cellulose and cellulose derivatives of Examples 1–5 which contain a single type of reactive addend, carboxylic acid, will be designated herein as a type 1 cellulose or cellulose derivatives while those of Examples 6–8 will be designated as type 2. Both types lend themselves to cross-linking by appropriate chemical reactions. The degree of cross-linking will, of course, vary with the number of opportunities presented in the number of reactive sites, and the completeness of the cross-linking reaction. Cross-linking in a solvent produces a more or less randomly cross-linked polymer while cross-linking of a crystalline solid, such as that of Example 2, results in a well oriented polymer.

*Example 9.*—Five grams of cellulose nitrate produced in the manner of Example 1 were warmed for ten minutes at 40° C. with freshly distilled thionyl chloride. The excess thionyl chloride was removed by distillation at room temperature under reduced pressure and the resulting cellulose nitrate in which the carboxylic acid groups had been replaced by acid chloride groups was then treated with a solution of ethylene glycol (1 ml.) in anhydrous dioxane (5 ml.) and warmed at 40–50°. The cross-linked product was removed by filtration and washed with anhydrous dioxane and dried at room temperature under reduced pressure.

It is not essential that ethylene glycol be employed as the cross-linking agent, other compounds containing two or more groups reactive with the acid chloride groups on the cellulose could also be employed. Glycerol and p-phenylene diamine have been used with success.

*Example 10.*—Five grams of cellulose acetate of Example 4 was dissolved in 100 ml. of anhydrous dioxane to which was added 5 ml. of thionyl chloride. The solution was warmed at 40–50° and the product separated by pouring the solution into anhydrous petroleum ether. Five grams of precipitate was collected and dried at reduced pressure. The precipitate was dissolved in a mixture of 100 ml. of dioxane, 1 ml. of ethylene glycol and 0.5 ml. of dimethyl formamide. On heating to 40–50° C. the cross-linked cellulose acetate separated out and was collected.

A type 1 methylated cellulose was treated in the same manner as the cellulose acetate of Example 9, with similar results. Both type 1 methylated cellulose and type 1 cellulose acetate can be cross-linked with other compounds containing two or more hydroxyl or amino groups. Cellulose nitrate which contains carboxylic acid groups can also be cross-linked by treatment with a divalent cation; for example, by suspending it in a dilute solution of calcium hydroxide.

*Example 11.*—Type 2 cellulose nitrate was cross-linked by treating it with freshly distilled thionyl chloride at 45–50° C. for ten minutes and then removing the excess thionyl chloride by washing the insoluble product with petroleum ether and drying under reduced pressure.

*Example 12.*—Five grams of type 2 cellulose acetate was dissolved in 100 ml. of anhydrous dioxane. Five ml. of freshly distilled thionyl chloride was added and the solution warmed to 40–50° C. The cross-linked product separated from solution as a flocculent gel which was removed by filtration, washed, and dried at room temperature. This cellulose acetate could also be cross-linked by catalytic esterification of the acetate in a dioxane solution using an acid catalyst such as sulfuric.

Type 2 methylated cellulose was cross-linked in the same manner as the cellulose nitrate of Example 11.

*Example 13.*—A solution of 5 grams of type 2 cellulose acetate in a mixture of anhydrous dioxane, 50 ml. and dimethyl formamide, 5 ml., was warmed at 40–50° C. with 0.1 gm. of the acid chloride of terephthalic acid. Five grams of the insoluble cross-linked product separated from solution, dried and was recovered.

*Example 14.*—A solution of cellulose acetate prepared in the manner of Example 12 was treated with a copper oxide powder; a gel was formed as a result of the cross-linking of the cellulose acetate and the cellulose acetate was chemically bonded to the copper oxide. It is apparent that by cross-linking a cellulose derivative-based lacquer to a metal surface, the bonds between lacquer and the metal are superior to those of conventional lacquers employed for metals due to the metal-lacquer chemical bonds.

*Example 15.*—Ten grams of type 1 cellulose acetate lacquer base produced according to the procedure of Example 4 were dissolved in anhydrous dioxane and treated with thionyl chloride. The solution was immediately poured onto an ordinary (not specially cleaned or treated) plate of copper and the solvent evaporated under a heat lamp. The temperature of the plate was maintained at less than 100° C. by periodically withdrawing the lamp as the copper reached about that temperature. The resulting film was firmly bonded to the plate without curling at the edges. Furthermore, it could not be stripped or peeled from the plate but could be removed only with a chisel. A lacquer compounded with this type of cross-linkable cellulose obviously has desirable properties.

The strength of cellulose fibers may be enhanced by treating them according to the manner hereinbefore described to produce a cross-linked fiber. Cellulose acetate films and lacquers may also be improved by cross-linking after the formation of the film or lacquer as set forth hereinbefore. The heat resistance and creep resistance of cellulose and/or its derivatives may be improved by controlled cross-linking of the molecules. In solid propellants for example, it is desirable that the grain be strong, self supporting, and resistant to cracking and warping without the addition of a material which unduly increases its dead weight. By cross-linking the nitrocellulose of a propellant grain in any of the aforedescribed modes, the strength of the grain may be greatly enhanced.

Although any suitable cross-linking agent may be employed, the cross-linking agent may be especially fitted to the properties required in the final cross-linked product. As shown in the drawing, a typical cellulose material consists of a plurality of fibers 12. In region 13 these fibers may be interwoven so that in this region the substance is amorphous while in region 14 the fibers are ordered and more crystalline. In the crystalline regions the fibers are more widely spaced than in the amorphous region. Accordingly, a cross-linking agent in which the molecular distance between its reactive portions is rather short would be effective to cross-link chains 12, at 16, for example, where the chains are relatively close. If the polymer is strongly cross-linked in the amorphous region, it loses much of its elasticity since the fibers are prevented from flexing and stretching as they are subjected to tension.

Cross-linking in region 14, at 17, for example, prevents relative slippage between the fibers and at the same time allows flexure in region 13. Accordingly the tensile strength may be increased without affecting the elasticity. Cross-linking in region 14 may be accomplished with bigger cross-linking molecules which do not "fit" into the amorphous region. A mixture of cross-linking agents also may be employed to vary these properties in any manner desired.

Moreover, cross-linking of a solid crystalline derivative produces a product with properties of a well oriented cross-linked polymer as shown in the following example.

*Example 16.*—The nitrated gauze of Example 5 was treated with a mixture of thionyl chloride (5 ml.) in 25 ml. of anhydrous dioxane at 40°, and then after washing the acid chloride several times with anhydrous petroleum ether (B.P. 50–60°) suspended in a mixture of 5 ml. ethylene glycol in 20 ml. of dioxane at 40° to cross-link the gauze while still in the solid state.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The process of cross-linking a cellulose material comprising oxidizing said material to form carboxylic acid groups and functional groups consisting of aldehydes and ketones in the molecule of the material, selectively reducing said functional groups to the corresponding alcohol thereby to produce a cellulose product containing hydroxyl groups and carboxylic acid groups, treating said product with thionyl chloride to form the acid chloride thereof and reacting said acid chloride product with a polyfunctional organic compound selected from the group consisting of polyhydroxyl compounds and polyamino compounds to cross-link said product therewith.

2. A method of cross-linking cellulosic compositions which comprises forming carboxylic acid groups on the cellulose molecule of a material selected from the group consisting of cellulose, cellulose acetate, methylated cellulose and cellulose nitrate, treating a carboxylic acid derivative of said group with thionyl chloride to form the acid chloride thereof and reacting the resulting acid chloride derivative with a polyfunctional organic compound selected from the group consisting of polyhydroxyl compounds and polyamino compounds to cross-link said derivative therewith.

3. A composition of matter comprising a cellulosic material selected from the group consisting of cross-linked cellulose and cross-linked cellulose derivatives which has been treated prior to cross-linking so as to form acid chloride groups thereon and which has been cross-linked through reaction between said acid chloride groups and a polyfunctional organic compound selected from the group consisting of polyhydroxyl compounds and polyamino compounds.

4. The composition of claim 3, wherein said cellulosic material is cross-linked cellulose nitrate.

5. The composition of claim 3, wherein said cellulosic material is cross-linked cellulose acetate.

References Cited by the Examiner
UNITED STATES PATENTS

| | | | |
|---|---|---|---|
| 1,946,647 | 2/1934 | Taylor et al. | 148—6.14 |
| 2,307,783 | 11/1943 | Malm et al. | 117—127 |
| 2,336,985 | 12/1943 | Freund. | |
| 2,339,912 | 1/1944 | Coffman et al. | 8—129 |
| 2,520,609 | 8/1950 | Morgan | 260—213 |
| 2,598,407 | 5/1952 | Marvel | 260—226 |
| 2,730,524 | 1/1956 | Nieuwenhuis | 260—212 |
| 2,758,112 | 8/1956 | Waning | 260—212 |
| 2,776,918 | 1/1957 | Bersworth | 148—6.14 |
| 2,798,009 | 7/1957 | Gault | 117—127 |
| 2,865,870 | 12/1958 | Pinder | 260—13 |
| 2,871,143 | 1/1959 | Getting | 117—127 |

FOREIGN PATENTS

| | | |
|---|---|---|
| 192,173 | 1/1923 | Great Britain. |
| 8,487 | 3/1923 | Netherlands. |

WILLIAM H. SHORT, *Primary Examiner.*

RICHARD D. NEVIUS, JAMES A. SEIDLECK, JOSEPH L. SCHOFER, *Examiners.*